United States Patent [19]

Hamilton

[11] Patent Number: 5,647,616
[45] Date of Patent: Jul. 15, 1997

[54] SAFETY FISHHOOK DISPENSER AND TYING DEVICE

[76] Inventor: Hugh W. Hamilton, 4855 El Verano, Atascadero, Calif. 93422

[21] Appl. No.: 309,241

[22] Filed: Sep. 19, 1994

[51] Int. Cl.⁶ .................................................. B65H 69/04
[52] U.S. Cl. ................................................................ 289/17
[58] Field of Search .............................. 289/2, 17, 18.1; 7/106; 43/1, 4

[56] References Cited

U.S. PATENT DOCUMENTS

| | | | |
|---|---|---|---|
| 2,682,126 | 6/1954 | Shepherd | 43/1 |
| 2,697,624 | 12/1954 | Thomas et al. | 289/17 |
| 2,758,858 | 8/1956 | Smith, Sr. | 289/17 |
| 2,934,369 | 4/1960 | Kennedy | 289/17 |
| 3,106,417 | 10/1963 | Clow | 289/17 |
| 3,131,957 | 5/1964 | Musto | 289/17 |
| 3,265,422 | 8/1966 | Pierce | 289/17 |
| 3,396,998 | 8/1968 | Scoville | 289/17 |
| 3,625,556 | 12/1971 | Stromberg | 289/17 |
| 3,837,691 | 9/1974 | Smythe | 289/17 |
| 3,873,140 | 3/1975 | Bloch | 289/17 |
| 4,414,771 | 11/1983 | Martin | 43/4 |
| 4,790,575 | 12/1988 | Tate | 289/17 |

*Primary Examiner*—Michael A. Neas

[57] ABSTRACT

A hand held implement (20) of two pieces to tie, secure, and dispense fishhooks (60). Implement (20) consists of a cylindrical longitudinal bore (38), vertical safety chamber (40), and extended sliding mandrel tying end (29). Top plane (FIG. 2) provides a vertical opening for the safety hook chamber (40), threading line guide (44), and a vertical flute guide (52). The second part includes a cylindrical longitudinal sliding helical mandrel (24), vertical receiving hook flutes (34), spring chamber (32), and sliding mandrel tying end (29). The helical spring (46) provides actuating and biasing means that urges barbed fishhooks (60) into the vertical safety hook chamber (40) exposing a secure hook eyelet (62) for tying, while the sliding mandrel tying end (29) extends beyond the implement (20) end portion (66). Thus, the sliding helical mandrel (24) extends the vertical receiving hook flutes (34) to dispense the hook (60).

11 Claims, 3 Drawing Sheets

SAFETY FISHHOOK DISPENSER AND TYING DEVICE

BACKGROUND AND FIELD OF INVENTION

This invention relates to a hand held device for tying line to fishhooks and is particularly concerned with safety, shielding the barbed hooks while tying a uniform knot. It is designed to dispense fishhooks used by fishermen in securing hooks, leaders, swivels, lures or manufacturing loops and combining other lines together.

BACKGROUND DESCRIPTION OF PRIOR ART

In the field of commercial and sport fishing, the use of new and improved monofilament line or other grades of line used cause difficult results in handling while trying to tie complex knots, due to the stiffness and smooth exteriors of lines. Thus, tying devices are incapable of isolating or providing adequate protection from the barbed fishhook left dangerously exposed in a stationary or dangling position, either in front or behind the tying device, while trying to tie or complete a complex knot. U.S. Pat. No. 3,837,691 to Smythe 1973 April 9. U.S. Pat. No. 3,131,957 to Musto 1963 June 18, and U.S. Pat. No. 2,697,624 to Thomas and Abercht 1951 November 3, do not provide adequate protection from the barbed hooks for the user, which in many cases result in injury.

Disadvantages exist while using other types of knot tying devices such as U.S. Pat. No. 2,758,858 to Smith 1954 November 30, U.S. Pat. No. 3,106,417 to Glow 1962 March 16, and U.S. Pat. No. 3,837,691 to Smythe 1973 April 3. After the fish line has been threaded through the fishhook eyelet or other items and the knot has been formed around the fixed mandrel end, the formed knot has to be relieved and expanded in order for the knot winding to drop off the end of the mandrel before the knot can be pulled tight.

Another problem is in removing the knot winding from this fixed mandrel tying end, by either rolling off the knot winding forming the knot with the thumb or pushing it off with the thumb nail. In doing so, this action loosens the tension on the mandrel winding as well as losing the required number of windings to complete the knot before it can be pulled tight.

Another existing problem is that other styles of barbed hook holders and tying devices leaves the barbed hook exposed while the user tries to thread a fish line end through the hook eyelet, such as U. S. Pat. No. 2,682,126 to Shepherd 1954, June 6. The hook has to be removed from the holder to permit conventional manual tying of the knot.

Another existing problem is with the design shape and size of the other tying devices. They are difficult and cumbersome to handle, while they do not accommodate to the hand, such as U. S. Pat. No. 4,414,771 to Martin 1983 November 15. This patented device does not provide a convenient tying dispenser. It is cumbersome to use and not easily carried on one's person.

Further difficulty with other tying devices is they are complex and complicated to understand for those not accustomed in the art of tying complicated knots. This example may be observed in U.S. Pat. No. 3,873,140 to Block 1975 March 25. The major problem existing with the fixed mandrel is the inability to protect and secure the barbed fishhook in a stable manner.

Prior art does not provide the method for securing a fishing line to a protected and securely held barbed fishhook while facilitating a preferred knot.

OBJECT AND ADVANTAGES

Accordingly, it is an object of this present invention to provide an improved and novel safety hook holder dispenser and tying device due to the novel design shape that accommodates any size hand and includes being compact, lightweight and thin.

Another object of this present invention is to provide an improved and novel safety hook holder dispenser and tying device having a cylindrical longitudinal bore implement that provides an open, centered, vertical, safety hook chamber in one end, while providing a cylindrical opening in the adjacent end to accommodate the cylindrical sliding helical mandrel tying end portion.

Another object of this present invention is to provide an improved and novel safety hook holder dispenser and tying device that provides a sliding helical mandrel consisting of a cylindrical rod that has a vertical receiving hook flutes portion in one end. The adjacent end portion provides the sliding helical mandrel tying end portion with a centered vertical flute guide for facilitating a knot.

It is another object of this present invention to provide an improved and novel safety hook holder dispenser and tying device that provides a helical spring chamber in the sliding helical mandrel cylindrical rod, located midway between the two end portions.

It is another object of this present invention to provide an improved and novel safety hook holder dispenser and tying device that provides a helical spring inlaid in the sliding helical mandrel chamber. It includes the transverse spring pin holder that enables the helical spring to provide the compression and tension required for extending and retracting the sliding helical mandrel.

Another object of this present invention is to provide an improved and novel safety hook holder dispenser and tying device that provides a sliding helical mandrel tying end portion which extends beyond the implement longitudinal bore. The mandrel tying end portion may be retracted into the implement by the biasing means, urging the actuating means in the direction of extending the sliding helical mandrel tying end portion from the implement to its original position, thus removing the knot winding from the helical mandrel tying end.

Another object of this present invention is to provide an improved and novel safety hook holder dispenser and tying device that has a centered vertical safety hook chamber. The receiving hook flutes located in the sliding helical mandrel end portion may be extended from the implement by an actuating means. This actuating means acts in opposition to the biasing means in a direction that retracts the receiving hook flutes sliding helical mandrel end portion into the implement, holding the barbed fishhook secure.

Another object of this present invention is to provide an improved and novel safety hook holder dispenser and tying device that provides a vertical safety hook chamber where the vertical receiving hook flutes hold the barbed hook(s) in a stable position, not allowing the barbed fishhook to swivel, nor become dislodged. The hook shank is held securely while exposing the hook eyelet, centered in line with the threading guide flute.

Another object of this present invention is to provide an improved and novel safety hook holder dispenser and tying device that is of simple, rugged construction; effective in retaining barbed fishhooks in a positive position while they are tied to a fishing line; and inexpensive to build.

Another object of this present invention is to provide an improved and novel safety hook holder dispenser and tying device that provides an improved dispensing means to remove one or more barbed fishhooks retained in the sliding helical mandrel, vertical receiving hook flutes, located in the centered vertical safety hook chamber. The barbed fishhook(s) is extracted from the vertical safety hook holder by an actuating means, urging the vertical receiving hook flute sliding helical mandrel end portion back into the housing to its original position.

Another object of this present invention is to provide an improved and novel safety hook holder dispenser and tying device that is capable of securing an oversized barbed fishhook in the vertical safety hook chamber, which provides a centered hook holder in which to position the pointed curved barbed fishhook.

Further objects and advantages of the invention reside in the details of construction of its various parts, in their combination and relationship, and in the manner of their use.

DRAWING FIGURES

Figure 9:
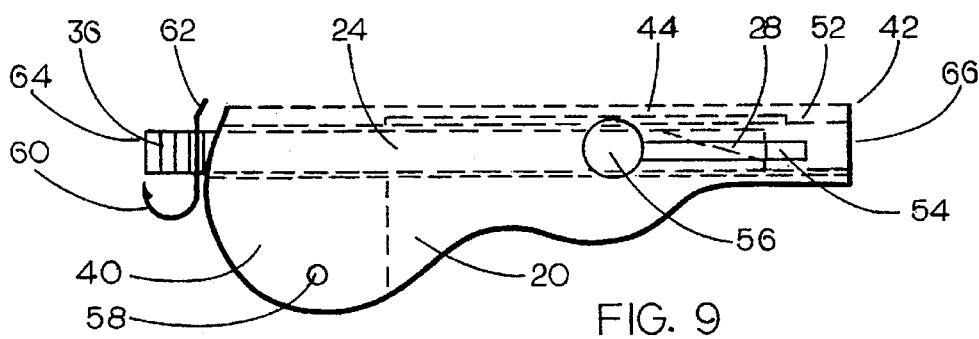
Figure 10:
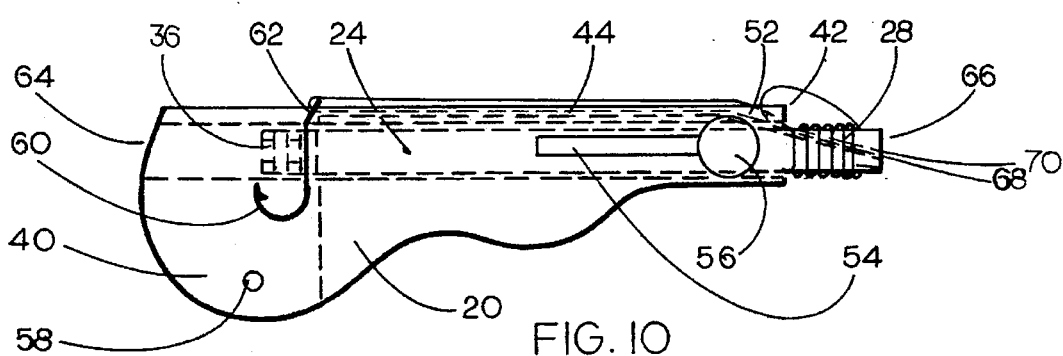
Figure 11:
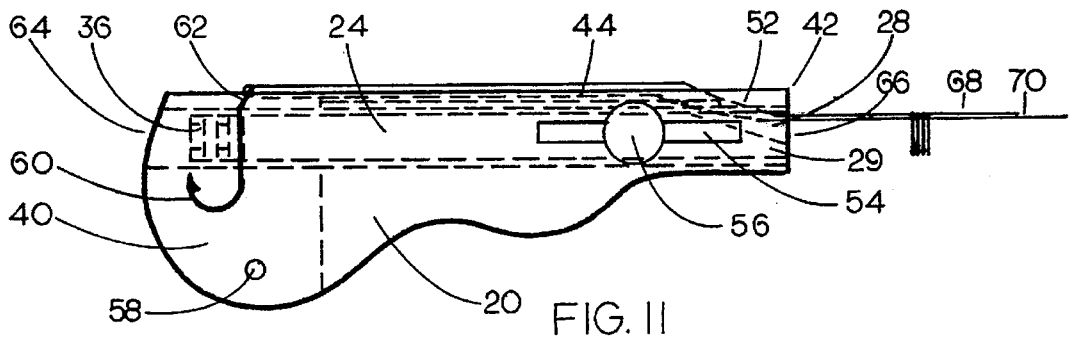

FIG. 9, 10, and 11 is a plane side view diagram illustrating successive operations in the securing of a fish line to hook.

Figure 12:
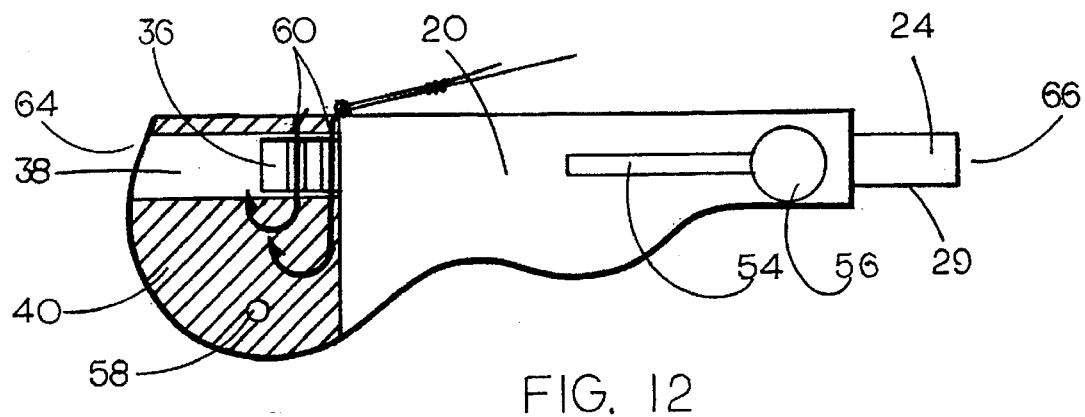

FIG. 12 is a plane side view with a sectional view illustrating barbed fishhooks held in the vertical safety hook chamber.

Figure 13:
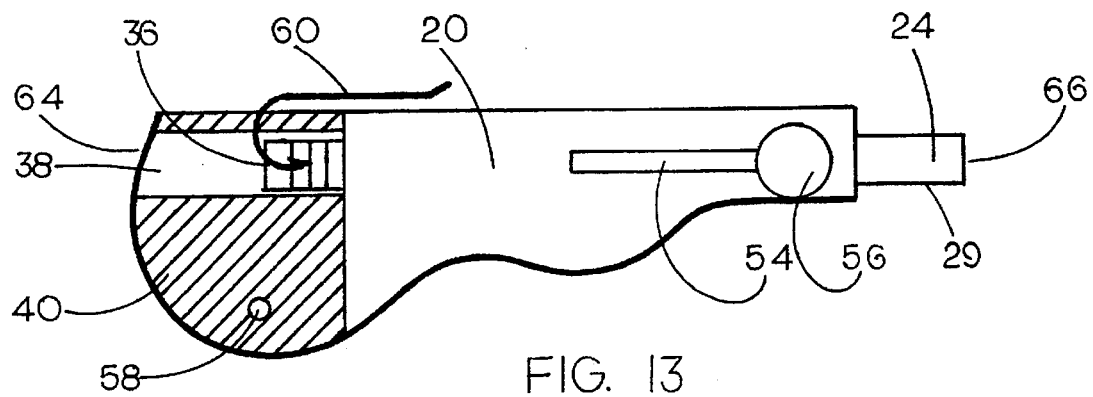

FIG. 13 is a plane side view with a sectional view illustrating placement of oversized hooks.

Figure 14:
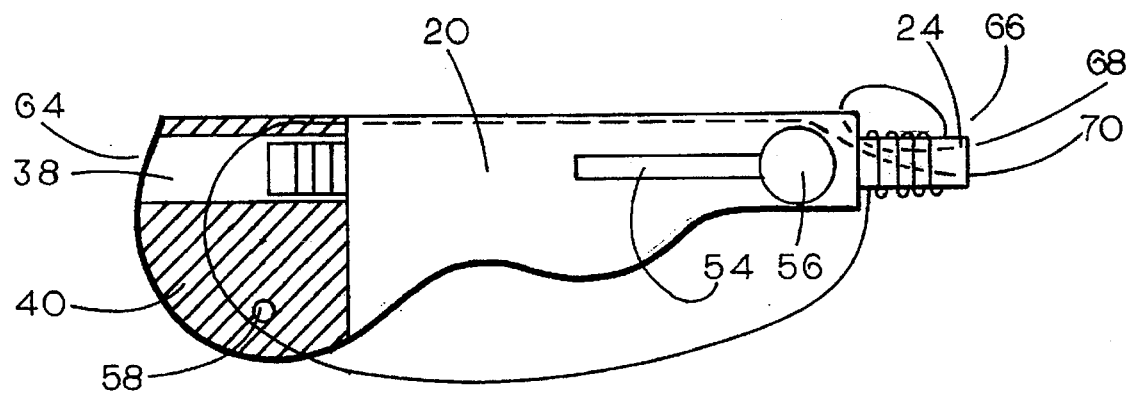

FIG. 14 is a plane side view with a sectional view illustrating tying a sliding loop.

REFERENCE NUMERALS IN DRAWINGS

| Reference Numerals in Drawings | |
| --- | --- |
| 20 | Implement |
| 22 | Implement Design Shape |
| 24 | Sliding Helical Mandrel |
| 28 | Mandrel Vertical Flute Guide |
| 29 | Mandrel Tying End |
| 30 | Mandrel Lever Connection |
| 32 | Mandrel Spring Chamber |
| 34 | Mandrel Vertical Receiving Hook Flutes |
| 36 | Mandrel Center Hook Flutes |
| 38 | Implement Longitudinal Bore |
| 40 | Implement Vertical Safety Chamber |
| 42 | Implement Tying Shoulder |
| 44 | Implement Threading Guide Flute |
| 46 | Mandrel Helical Spring |
| 48 | Spring Pin Holder |
| 50 | Spring Pin Shaft Holder |
| 52 | Implement Vertical Flute Guide |
| 54 | Implement Parallel Channel Flute |

-continued

| Reference Numerals in Drawings | |
| --- | --- |
| 56 | Sliding Mandrel Lever |
| 58 | Implement Lanyard Connection |
| 60 | Barbed Fishhook |
| 62 | Hook Eyelet |
| 64 | First End Portion |
| 66 | Second End Portion |
| 68 | Line Free End |
| 70 | Line Tailing End |

SUMMARY OF INVENTION

The safety hook holder dispenser and tying device holds the barbed fish hook secure in the safety hook chamber, secures a fish line through the hook eyelet, and facilitates tying a knot. A sliding helical mandrel has receiving hook flutes in one end, and a vertical line guide flute in the sliding mandrel tying end. The helical spring provides the biasing that either extends or retracts the actuating means, whereby knot windings are formed. The sliding helical mandrel tying end portion is extracted from the knot winding, and then returns the sliding helical mandrel tying end portion to its original position. The dispensing method provides the removal of the hook(s) also. The vertical receiving hook flutes can secure one or more hooks in the vertical safety hook chamber. The hook can be tied again or dispensed as needed, and it is safe to carry on one's person.

DESCRIPTION—FIGS. 1–8

Figure 2:
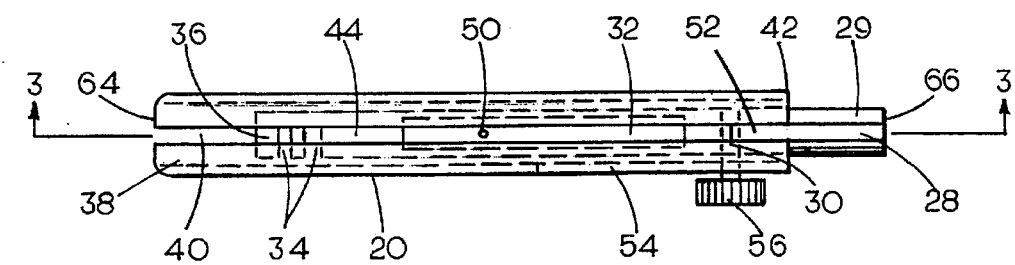
FIG. 2 is a top plane view of a device embodying the present invention.
Figure 3:
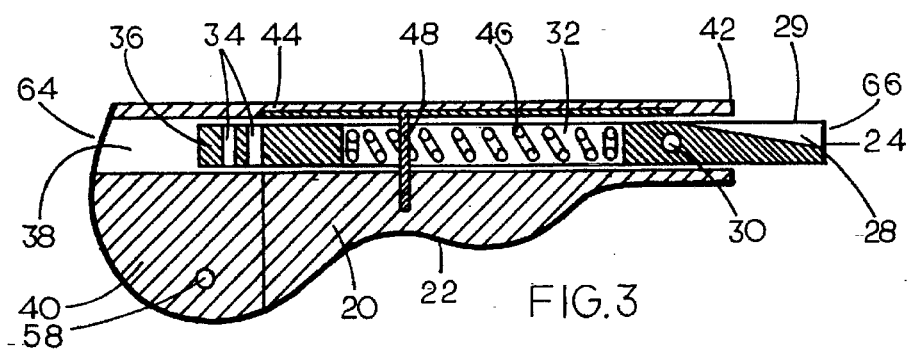
FIG. 3 is a side section view of a device embodying the present invention taken on line 3—3 of FIG. 2.
Figure 4:
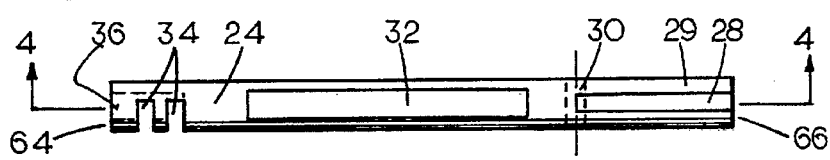
FIG. 4 is a top plane view of a sliding helical mandrel.
Figure 5:
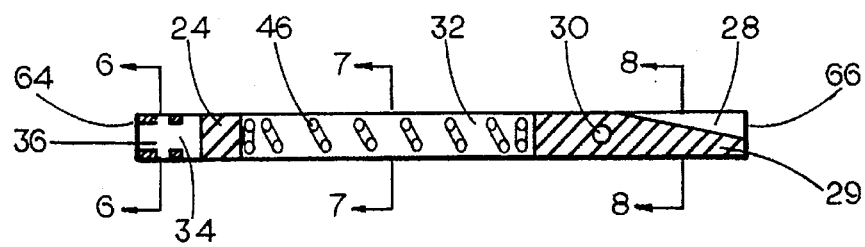
FIG. 5 is a section view of a sliding helical mandrel taken on line 4—4 of FIG. 4.
Figure 6:
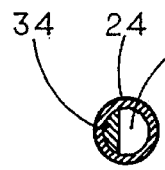
FIG. 6 is a cross-sectional view of the vertical receiving hook flutes taken on line 6—6 of FIG. 5.
Figure 7:
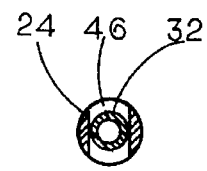
FIG. 7 is a cross-sectional view of the sliding helical mandrel spring chamber taken on line 7—7 of FIG. 5.
Figure 8:
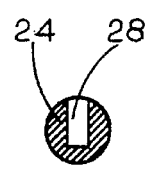
FIG. 8 is a cross-sectional view of the mandrel tying end flute taken on line 8—8 of FIG. 5.

Refer now more in detail to the drawings and more particularly to FIGS. 2 and 3, Exhibit A, safety fishhook dispenser and tying device, made in accordance with the present invention, an implement 20, having a sliding helical mandrel 24. Both have a first end portion 64 and a second end portion 66. The implement 20 has a cylindrical longitudinal bore 38 opened at either end and of sufficient size to house the sliding helical mandrel 24. FIG. 4 shows the sliding helical mandrel 24 being of a cylindrical rod having a spring chamber 32 located between the first end portion 64 and second end portion 66. FIGS. 3 and 5 show a helical spring 46 inlaid in the sliding helical mandrel 24 spring chamber 32. FIG. 3 shows a transverse spring pin holder 48 passing through the center of the threading guide flute 44. The spring chamber 32, helical spring 46 is imbedded in the spring pin shaft holder 50, FIG. 2, and is shown in the location below the longitudinal bore 38, thus locking the sliding helical mandrel 24 into position and pressed through the center of the implement 20. FIG. 3 shows the position of the sliding helical mandrel 24, first end portion 64, and second end portion 66 and held secure by the compression and tension applied by the helical spring 46 to either end portion. FIGS. 2 and 3 show a parallel channel flute 54 along either side of the implement 20, depending on whether the implement is right or left-handed. It is illustrated for the right hand. The sliding helical mandrel lever 56 is attached through the implement 20 parallel channel flute 54 to the sliding helical mandrel lever connection 30, FIG. 3. This serves as means for manually retracting the sliding helical mandrel 24. FIG. 2 shows the second end portion 66 of the sliding helical mandrel 24 being cylindrical, extending past the second end portion 66 of the implement 20. The mandrel tying end portion 29 of the mandrel 24 has a centered vertical flute guide 28. The implement 20 second end portion 66 also has a vertical centered flute guide 52 located in line above the mandrel tying end 29 portion 24. These two flute guides have to be vertical and longitudinally centered with each other in order to facilitate the line's free end 68 provided in the mandrel tying end portion 29 of the second end portion 66. FIG. 2 or 3 provides a tying shoulder 42 to start the knots to be facilitated on the mandrel Bring end portion 29 on the second end portion 66. FIG. 3 shows a sliding helical mandrel 24 on the first end portion 64 which provides the fishhook vertical receiving hook holder flutes 34. The flutes are of two sizes, one for small hooks, the other for large hooks. The flutes secure and lock the barbed fishhook 60 in place by the hook shank, while held in a vertical safety hook chamber 40 provided in the implement 20 first end portion 66. FIGS. 9–13 show the fish hook locked into position by the vertical receiving hook flutes 34 in the vertical safety hook chamber 40, with a barbed fishhook eyelet 62 exposed in line with the threading guide flute 44 located between the vertical safety hook chamber 40 and the threading guide flute 44. FIGS. 4, 5 and 13 show a sliding helical mandrel 24 first end portion 66 with a centered hook holder 36 to insert and secure oversized hooks between the vertical safety hook chamber 40. FIG. 13 shows the implement 20 and the sliding helical mandrel 24 holding one or more fishhooks locked into the safety hook chamber 40. The implement 20, design shape 22, and the sliding helical mandrel 24 can be enlarged and lengthened to accommodate more hooks 60, depending on the construction desired. FIG. 6, 7, and 8 show an end cross-section view to illustrate these parts for the builder.

Figure 1:
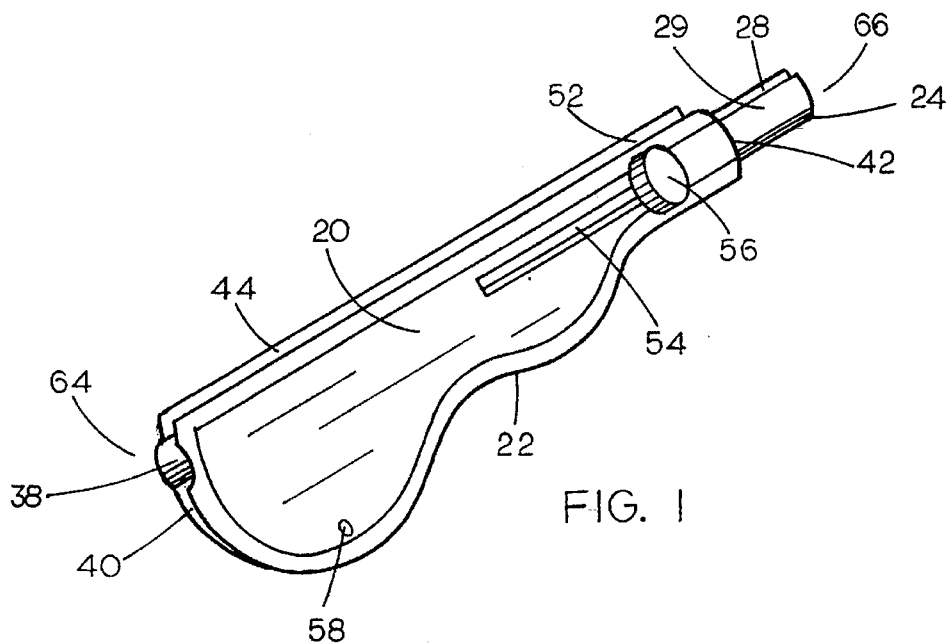
FIG. 1 is a perspective view of a safety hook dispenser and knot tying device.

FIG. 3 shows an implement 20 first end portion 64 with a lanyard connection 58 in the lower portion. FIG. 1 shows an implement 20 having a sweeping design shape 22 and being moderately thin and flat. It is easily held in the palm of the hand or carried in the pocket. Thus, this safety hook dispenser and tying device can be made or manufactured using metal, plastic, or other durable materials. It may also be inexpensively manufactured through mold injection. Assuming the present safety hook dispenser and tying device is to be constructed, the mode of operations is a follows.

OPERATION FIGS. 1, 2, 3, 9–14

Place the implement 20 with its design shape 22 in the palm of the hand and apply thumb pressure on the sliding helical mandrel lever 56. FIG. 2 shows the connection between the sliding helical mandrel 24 through the implement 20 parallel channel flute 54 to the sliding helical mandrel lever connection 30.

FIG. 9 shows the sliding helical mandrel 24 retracted through the implement 20 longitudinal bore 38. The helical spring 46, FIG. 3, is located in the mandrel spring chamber 32. The helical spring 46 is now in a state of compression secured by the transverse spring pin holder 48, embedded in the implement 20 spring pin shaft holder 50 that allows the mandrel spring 46 to be either in a state of compression or tension. The sliding helical mandrel 24 is retracted through the implement 20 first end portion 66 and extends along the longitudinal bore 38, extending through the vertical safety hook chamber 40, and exposes the mandrel vertical receiving hook flutes 34. Beyond the implement 20 first end portion 64, the barbed fishhook or hooks 60 are placed in the exposed mandrel vertical receiving hook flutes 34, then thumb pressure is released from the sliding helical mandrel lever 56. FIG. 10 shows the compression provided by the helical spring 46 and provides the tension required to urge the extended sliding helical mandrel 24 back to its original position, while urging the mandrel vertical receiving hook flutes 34 with the barbed fishook(s) 60 into the vertical safety hook chamber 40 first end portion 64. In this position, the mandrel tying end portion 29 of the sliding helical mandrel 24 second end portion 66 is positioned. FIGS. 3 and 10 show the barbed hook(s) 60 held by the hook shank inlaid in the sliding helical mandrel vertical receiving hook flutes 34. They cannot swivel nor become dislodged while secured in this position in the vertical safety hook chamber 40 due to the holding tension provided by the mandrel helical spring 46. This provides total security and safety from the fishhooks 60 for tying the desired knots. In this position, only the barbed fishhook eyelet 62 is exposed and held recessed in the implement 20 in line with the threading guide flute 44 towards the implement 20 second end 66 vertical flute guide 52 and the sliding helical mandrel vertical guide 28.

FIG. 10 shows the implement 20 now being used to secure a fish line free end 68 to the barbed fishhook 60, forming a modified hangman's knot or blood knot on the second end portion 66 of the sliding helical mandrel 24 tying end portion 29. The barbed fishhook(s) 60 are held in position, and with the barbed fishhook eyelet 62 exposed, the line's free end 68 coming from a conventional rod and reel, or the like, is the line tailing end 70. The fish line's free end 68 is positioned and drawn through the mandrel vertical flute guide 28 provided in the sliding helical mandrel 24 tying end portion 29, past the implement vertical guide flute 52 end portion 66, along the threading guide flute 44, across the top portion of the implement 20, to pass through the barbed fishhook eyelet 62. Draw a sufficient amount of fish line to complete the knot desired, then loop the fish line's free end 68 around the hook eyelet 60, positioning the fish line's free end 68 back along the threading guide flute 44 towards the implement 20 vertical flute guide 52. Place the thumb near and on top of the implement 20 second end portion 66, just behind the implement 20 vertical flute guide 52 and hold the line's tailing end 70 and the line's free end 68 secure. Use the implement 20 tying shoulder 42 to hook the line's free end 68 to the knot. Wrap the line's free end 68 around the exposed mandrel tying end 29 five or more times, then thread the line's free end 68 down through the implement 20 vertical flute guide 52, and pass under the line winding through the mandrel vertical guide flute 28 in the mandrel tying end portion 29. As shown in FIG. 11, pull the line's free end 68 until it becomes tight. Still holding tension on the line winding by the line's free end 68, remove the thumb pressure and place the thumb on the sliding helical mandrel lever 56 and apply enough pressure to retract the sliding helical mandrel 24 tying end 29 from the formed knot winding. When the knot becomes free, release the thumb pressure from the sliding helical mandrel lever 56. The sliding helical mandrel 24 tying end portion 29 will extend back to its original position still holding the barbed fishhooks) 60 secure in the vertical safety hook chamber 40. Hold the implement 20 firm, and apply tension on the fish line's free end 68. FIG. 10 shows the knot slides towards the exposed hook eyelet 62. With a quick pull upwards, this will position and lock the knot, securing the knot to the barbed fishhook eyelet 62. Again place the thumb on the sliding helical mandrel lever 56, FIG. 9, and apply enough pressure to extend the sliding helical mandrel 24 first end portion 64 from the vertical safety hook chamber to expose the barbed fishhook 60 in the mandrel vertical receiving hook flutes 34. Remove the tied barbed fishhook 60, release the thumb pressure, and the sliding helical mandrel 24 vertical receiving hook flutes 34 retract to its original position shown in FIG. 1.

FIG. 12 shows the implement 20 securing one or more barbed fishhooks (60), located in the vertical safety hook chamber 40), ready to be tied or dispensed as needed. FIG. 13 shows the implement 20 securing an oversized barbed fishhook 60 placed through the top of the vertical safety hook chamber 40. It is held in the mandrel center hook holder 36 first end position 64 ready to be fled. FIG. 14 illustrates the method for securing a loop in a fish line. The tying and removal of the knot is illustrated in FIG. 9, 10 and 11 after the sliding helical mandrel 24 tying end portion 29 is retracted. The knot is pulled tight, then the knot and loop are removed from the implement 20. The line's free end 68 is pulled until the desired size of loop is established. With the line's free end 68, form and position a half hitch under the formed knot and pull tight, locking the knot and establishing a good loop in the fish line to secure leaders, swivels, bobs, sinkers, or the like. The implement 20 has an established lanyard connection 58 if one desires to carry it in that fashion. To combine two fish lines or a fish line and leader, or the like, tie and connect two fish lines together by inlaying two lines parallel in the implement 20 threading guide flute 44 and mandrel vertical flute guide 28. Draw the line's free end 68 and tie it as explained in FIGS. 9, 10 and 11. Reverse the lines, draw the other free end 68 and tie it. After removing the two tied lines, pull tight until the two knots slide together, forming the connection, thus combining the two lines together.

It is to be understood that the foregoing disclosures relate to a preferred embodiment of the invention and that numerous modifications and alterations can be made without departing from the spirit and scope of this invention as defined in the appended claims as follows.

Theory of Operation

A novel design shape including a cylindrical longitudinal bore implement, having a vertical safety hook chamber in one end portion while the adjacent end provides access for the extending sliding helical mandrel tying end portion. A sliding helical mandrel has vertical receiving hook flutes in one end portion, while the adjacent end provides the mandrel tying end and has a biasing means provided by the helical spring located in the sliding mandrel spring chamber, which creates the compression and tension required for these actuating and biasing means. The compression and tension is provided by the helical spring pin holder passing through the spring, which also holds the sliding helical mandrel in position, while extending or extracting each time to the original position.

Summary, Ramification, and Scope

The reader will see that the safety hook holder dispenser and tying device of this invention provides a novel design shape that allows use by persons of almost any age. It is precisionally made with highly reliable material, lightweight yet economical in construction. The simple construction and ease in which this tool can be manipulated complements the ability of the user to understand the mechanics and operation of this invention. It provides a novel design shape that allows it to accommodate any size hand. It also provides a longitudinal bore that extends through the implement. The implement has two adjacent end portions—the vertical safety hook chamber and a mandrel tying end portion. It provides a sliding helical mandrel rod, cylindrical in shape, having two opposing end portions. The vertical receiving hook flutes and the adjacent end accommodate the mandrel tying end portion with a centered vertical flute guide. It provides a helical spring chamber located in the middle of the sliding mandrel while also providing an inlaid helical spring which provides compression and tension to either end of the sliding mandrel. It provides a helical spring that allows an actuating means in opposing position. It also provides sliding helical mandrel vertical receiving hook flutes end portions that extends beyond the implement's vertical safety hook chamber. The biasing urges the vertical receiver hook flutes into the implement's vertical safety hook chamber. After the knot windings have been accomplished, the sliding mandrel tying end portion is extracted from the knot winding. The biasing means urges the sliding helical mandrel back into its original position. A safety hook chamber is also provided to secure a barbed fishhook while securing a completed knot to the barbed fishhook eyelet while still holding the hook secure. A dispensing method is provided to remove the barbed fishhook from the vertical safety hook chamber and extend the vertical receiving hook flutes beyond the implement end portion. The barbed fishhook is removed from the vertical receiving hook flute in the sliding helical mandrel end portion, then retracted by the biasing means into the safety hook chamber.

The implement has a sliding helical mandrel first end portion, with a hollow centered end to engage oversized barbed fishhooks which are held secure in the vertical safety hook chamber. A safety hook chamber is provided to encompass the barbed fishhook, not allowing it to swivel or become dislodged while facilitating a knot or while carried on one's person.

While the above description contains many specifics, these should not be construed as limitations on the scope of the invention, but rather as an example of one preferred embodiment of this invention. Therefore, many other variations are possible. For example, the shape may be enlarged and lengthened to accommodate more hooks. Through plastic mold injection, the sliding mandrel could be made oval or square. It can operate without the helical spring. It could operate having a fixed mandrel tying end and a helical sliding mandrel vertical receiving hook flute end portion. It could provide a transversal bar in the vertical safety hook chamber while still having a sliding helical mandrel tying end portion. This implement could also be in a variety of colors and could be made from almost any type of durable material. It could also have minor variations in any of the flute guides, threading line guides, including the shape, size or depth. It could be reversed and made upside down and still would operate. Accordingly, the scope of the invention should be determined not by the embodiments Illustrated, but by the appended claims and their legal equivalents.

I claim:

1. A safety hook holder dispenser and tying device comprising an elongated thin, multi-curved implement, said implement has a cylindrical longitudinal bore extended through said implement, said implement being open at either end portion; said implement provides a vertical safety hook chamber open in a first end portion, a vertical channel guide in a second end portion, a helical spring inlaid within a sliding one-piece mandrel; whereby a spring pin holder secures both the helical spring and the sliding one-piece mandrel within the cylindrical longitudinal bore; said implement includes a side position which provides a longitudinal channel and a sliding mandrel lever; said implement further includes a top portion which provides an opening to implement said vertical safety hook chamber and a threading guide channel.

2. A tying device as defined in claim 1, wherein said cylindrical longitudinal bore that is singular in diameter extending. through said implement.

3. A tying device as defined in claim 1, said sliding mandrel is one-piece, cylindrical, with a singular diameter and length, that is capable of freely moving bidirectionally within said longitudinal bore.

4. A tying device as defined in claim 3, said sliding mandrel is one cylindrical piece having a first end portion, a second end portion, a sliding mandrel tying end portion, a longitudinal channel guide in the second end portion, mandrel vertical side hook channels, a center hook hole in the first end portion, and a mandrel spring chamber between the first and second end portion.

5. A tying device as defined in claim 4, said sliding mandrels first end portion has said vertical side hook channels, whereby said channels are of different dimensional widths, parallel to each other, and offset within a side portion of the sliding mandrels first end portion.

6. A tying device as defined in claim 3, said mandrel center hook hole located in a first end portion of said sliding mandrel in combination with said mandrel's vertical side hook channels, said mandrel center hook hole extends longitudinally and internally through both said mandrel's vertical side hook channels.

7. A tying device as defined in claim 4, said mandrel's spring chamber located between said first end portion and said second end portion, this chamber is of substantial size and inlaid within a sliding mandrel longitudinal portion.

8. A tying device as defined in claim 4, said sliding mandrel is capable of positioning a fish hook in five different locations in or on said sliding mandrel, whereby the sliding mandrel can also procure said fish hook in a horizontal, longitudinal, and vertical position.

9. A tying device as defined in claim 1, said helical spring is inlaid longitudinally with a mandrel spring chamber and provides the tension between a first end portion and a second end portion within said mandrel's spring chamber, which provides the position within said longitudinal bore when a spring pin holder is inserted.

10. A tying device as defined in claim 9, said helical spring provides the biasing means required to bidirectionally move the mandrel within the mandrel's longitudinal bore.

11. A tying device as defined in claim 9, said spring pin holder is positioned through a helical spring coil, and therefore provides the only biasing means required to move the mandrel bidirectionally.

* * * * *